(12) United States Patent
Rittmeyer

(10) Patent No.: US 9,912,213 B2
(45) Date of Patent: Mar. 6, 2018

(54) ROTATING RECTIFIERS WITH NESTED DIODES

(71) Applicant: Hamilton Sundstrand Corporation, Charlotte, NC (US)

(72) Inventor: Gregory A. Rittmeyer, Winnebago, IL (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 462 days.

(21) Appl. No.: 14/611,971

(22) Filed: Feb. 2, 2015

(65) Prior Publication Data

US 2016/0226348 A1 Aug. 4, 2016

(51) Int. Cl.
*H02K 11/04* (2016.01)
*H02K 11/042* (2016.01)

(52) U.S. Cl.
CPC .................. *H02K 11/042* (2013.01)

(58) Field of Classification Search
CPC .............. H02K 11/042; H02K 11/04
USPC ............................ 310/68 D, 68 R
See application file for complete search history.

(56) References Cited

U.S. PATENT DOCUMENTS

| | | | | |
|---|---|---|---|---|
| 4,603,344 A | * | 7/1986 | Trommer | H02K 11/042 310/68 D |
| 4,621,210 A | | 11/1986 | Krinickas, Jr. | |
| 4,628,219 A | * | 12/1986 | Troscinski | H02K 11/042 310/68 D |
| 4,745,315 A | | 5/1988 | Terry, Jr. et al. | |
| 4,827,165 A | * | 5/1989 | Nold | H02K 11/042 310/68 D |
| 5,065,484 A | | 11/1991 | Pinchott | |
| 5,796,196 A | * | 8/1998 | Johnsen | H02K 11/042 310/68 D |

FOREIGN PATENT DOCUMENTS

WO    WO-198601035 A1    2/1986

OTHER PUBLICATIONS

Extended Search Report dated Jun. 24, 2016 in connection with co-pending Application No. EP16153948.1.

* cited by examiner

*Primary Examiner* — Michael Andrews
(74) *Attorney, Agent, or Firm* — Locke Lord LLP; Scott D. Wofsy; Christopher J. Cillié

(57) ABSTRACT

A rectifier includes a diode with an anode face and an opposed cathode face that are both angled in relation to a rotation axis of the diode. A first diode plate overlays the diode anode face. A second diode plate overlays the opposed diode cathode face. The first and second diode plates are nested with one another such that portions of the diode plates axially overlap one another along a length of the diode rotation axis.

19 Claims, 7 Drawing Sheets

ROTATING RECTIFIERS WITH NESTED DIODES

BACKGROUND OF THE INVENTION

1. Field of the Invention

The present disclosure relates to electrical machines, and more particularly to synchronous machines like electrical machine generators.

2. Description of Related Art

Direct drive generators and integrated drive generators are commonly used of aircraft to convert mechanical energy into electrical power. Direct drive generators are generally connected to an aircraft engine directly, without a gearbox or transmission assembly, and may supply variable frequency alternating current (AC) electrical power to an aircraft. Integrated drive generators typically connect to aircraft engine through a continuously variable transmission such as a constant speed drive. The continuously variable transmission receives rotational energy from the engine having a variable speed, converts the variable speed rotational energy into constant speed rotational energy, and applies the constant speed rotational energy to the integrated drive generator, the integrated drive generator thereby producing constant frequency AC electrical power. Both direct drive generators and integrated drive generators may include a diode pack operatively associated with a rotor of the generator assembly.

Such conventional diode pack devices, rectifier systems, and methods of making and using such devices and systems have generally been considered satisfactory for their intended purpose. However, there is still a need in the art for improved diode packs. The present disclosure provides a solution for this need.

SUMMARY OF THE INVENTION

A rectifier includes a diode with an anode face and an opposed cathode face that are both angled in relation to a rotation axis of the diode. A first diode plate overlays the diode anode face. A second diode plate overlays the diode cathode face. The first and second diode plates are nested with one another such that portions of the diode plates axially overlap one another along a length of the diode rotation axis.

In certain embodiments, an oil transfer tube bushing can be axially disposed along the rotation axis. An end of the oil transfer tube bushing can be electrically connected to the diode through the first diode for grounding the diode through the oil transfer tube bushing. Each diode plate can include a body angled with respect to the rotation axis and having an axially extending key segment. The key segment can have an axial length that is greater than an axial height of the diode. The key segments can be rotationally offset from one another about the rotation axis.

In accordance with certain embodiments, a diode retainer can be axially disposed between the first and second diode plates such that the diode retainer circumferentially surrounds the diode. The diode retainer can define a keyway on its outer periphery, and a key segment of the second diode plate can seat in the diode retainer keyway. The diode retainer can define barrier walls adjacent to the keyway that electrically insulate the diode plates from one another in the radial direction. The diode retainer can define a central diode aperture bounded by a plurality of diode surfaces such that the diode and diode retainer share a common axial position. The diode retainer can define a plurality of flow apertures that bound the central diode aperture. Circumferentially adjacent flow apertures can be separated by one of the diode surfaces.

It is also contemplated that, in accordance with certain embodiments, the diode can be a first diode, and the rectifier can include a plurality of such diodes, for example six diodes, axially stacked in relation to one another. The rectifier can also include a plurality of diode plates, for example five diode plates, and each of the diode plates can be axially stacked between axially adjacent diodes and nested with an axially adjacent diode plate. The diodes and diode plates can form a diode pack with an axial length, and the rectifier can further include a diode pivot extending along the rotation axis and having an axial length greater than the length of the diode pack.

A generator includes a rotor shaft with a rectifier cavity, a rectifier as described above seated in the rectifier cavity, and a transfer tube in fluid communication with the rectifier. The rotor shaft is rotatable about the rectifier rotation axis. The transfer tube extends axially along the rotation axis and is connected electrically to the rectifier through the first diode plate.

In embodiments, the rectifier can include a transfer tube bushing seated between the first diode plate and the transfer tube. The transfer tube bushing can be fixed relative to the first diode plate and rotatable relative to the transfer tube for grounding the rectifier with the rotor shaft.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, preferred embodiments thereof will be described in detail herein below with reference to certain figures, wherein.

DETAILED DESCRIPTION OF THE PREFERRED EMBODIMENTS

Figure 1:
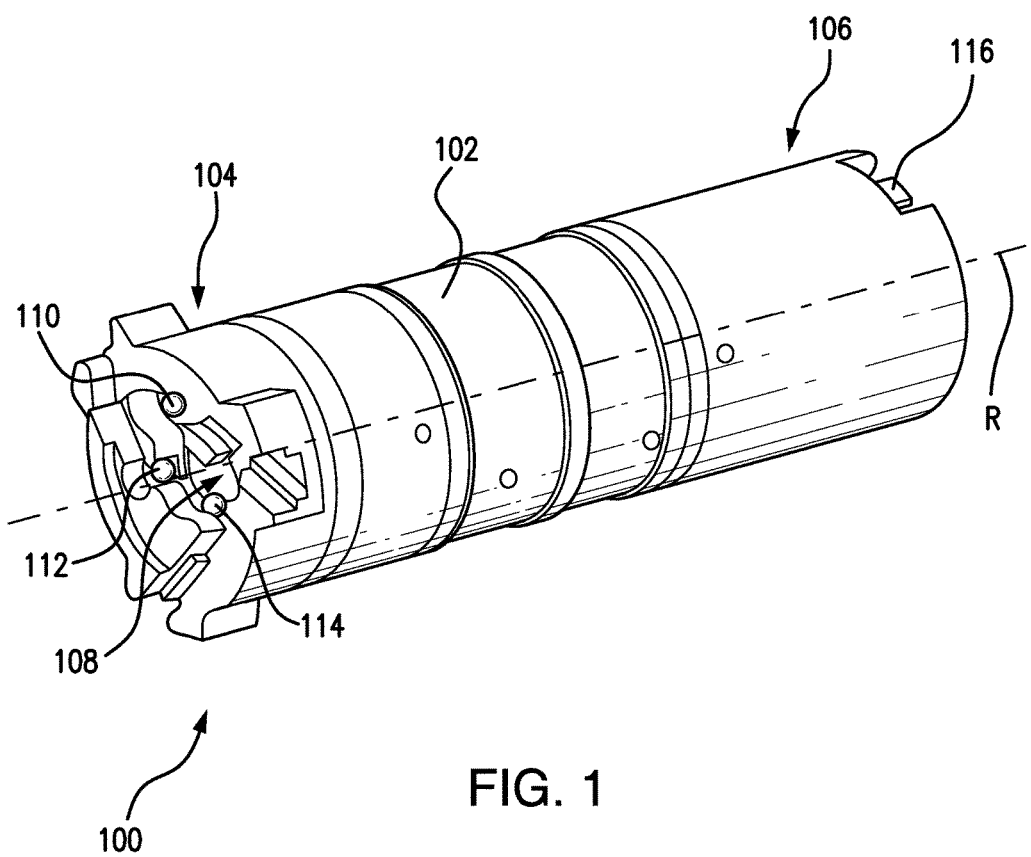
FIG. 1 is a perspective view of an exemplary embodiment of a rotating rectifier constructed in accordance with the present disclosure, showing input and output current leads.

Reference will now be made to the drawings wherein like reference numerals identify similar structural features or aspects of the subject disclosure. For purposes of explanation and illustration, and not limitation, a partial view of an exemplary embodiment of a rectifier in accordance with the disclosure is shown in FIG. 1 and is designated generally by reference character 100. Other embodiments of rectifiers in accordance with the disclosure, or aspects thereof, are provided in FIGS. 2-7, as will be described. The systems and methods described herein can be for electrical generators, such as aircraft main engine and auxiliary power unit generators.

Rectifier 100 includes a housing 102 with an input end 104 and an output end 106. Housing 102 defines a rotation axis R and a transfer tube bushing 108 with a coolant supply aperture disposed centrally and along rotation axis R. Transfer tube bushing 108 is configured to seat an oil transfer tube 208 (shown in FIG. 7) for receiving a coolant flow within housing 102, such as from a lubrication circuit 206 (also shown in FIG. 7) of a gas turbine engine. In this respect the coolant, like lubricant (e.g. oil), enters input end 104, traverses components disposed within housing 102, and exits housing 102 through output end 106. Input end 104 may include a plurality of alternating current (AC) electrical power input leads, and as illustrated includes a first AC terminal 110, a second AC terminal 112, and a third AC terminal 114. Output end 106 may include a positive direct current (DC) lead 116 and a negative DC lead 118 (shown in FIG. 2).

Figure 2:
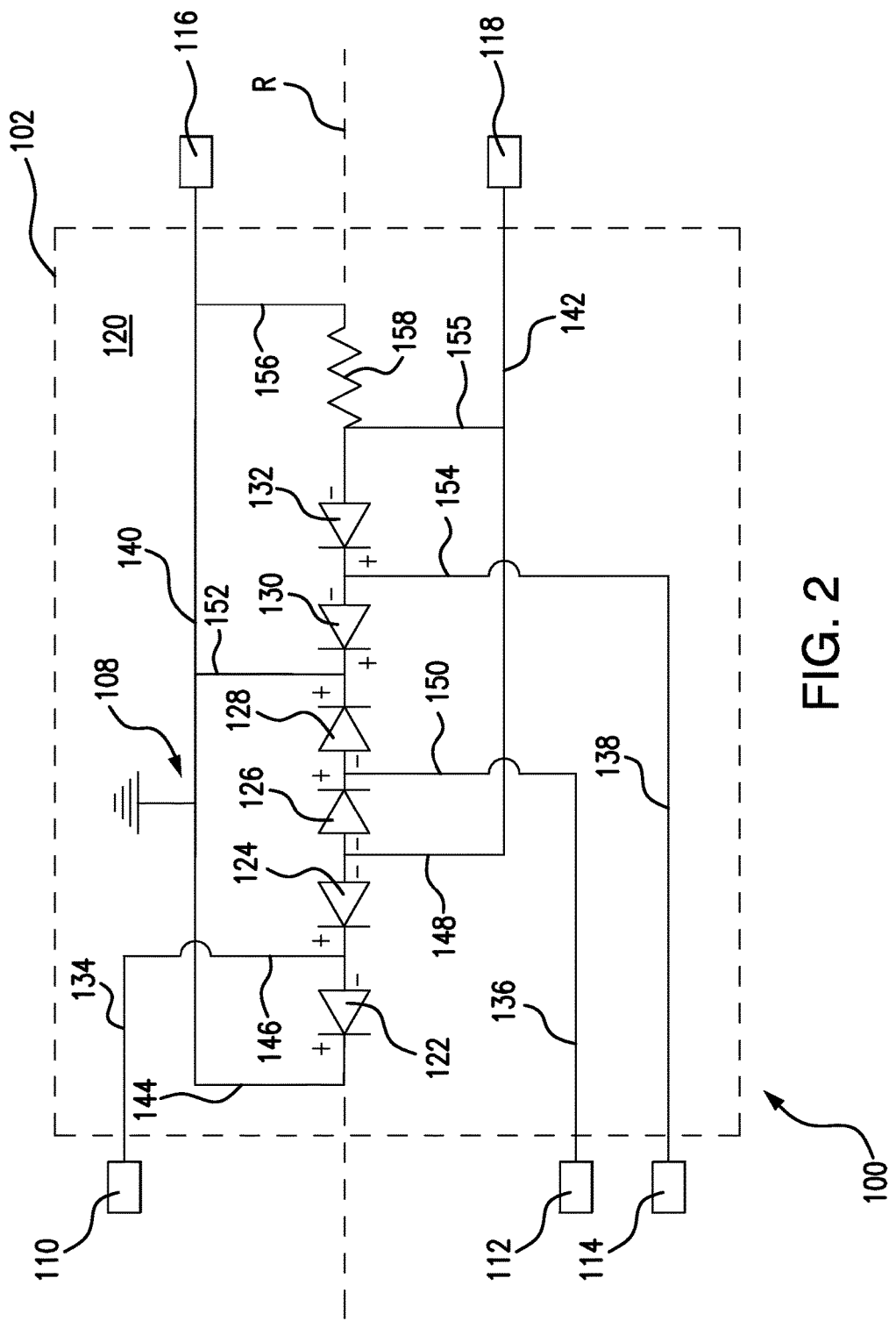
FIG. 2 is a schematic view of the rotating rectifier of FIG. 1, showing a circuit diagram of elements disposed within an interior of the rectifier.

With reference to FIG. 2, a rectifier circuit 120 is shown. Rectifier circuit 120 is disposed within an interior of housing 102 and includes a plurality of diodes and diode plates arranged along rotation axis R of rectifier 100. As illustrated, rectifier 100 includes five bus bars, six diodes, eight diode plates, and a resistor electrically connected with one another to form rectifier circuit 120. Each of the six diodes includes axially opposed anode and cathode faces, indicated with positive and negative symbols in FIG. 2, and which are coaxial with one another and angled relative to rotation axis R.

The five bus bars of rectifier circuit 120 include three AC bus bars, each carrying separate AC phases, and two DC bus bars. In this respect rectifier 100 includes a first AC bus bar 134 connected to first AC terminal 110, a second AC bus bar 136 connected to second AC terminal 112, and a third AC bus bar 138 connected to third AC terminal 114. Rectifier 100 also includes a positive DC bus bar 140 connected to positive DC terminal 116 and a negative DC bus bar 142 connected to negative DC terminal 118.

The six diodes of rectifier circuit 120 include a first diode 122, a second diode 124, a third diode 126, a fourth diode 128, a fifth diode 130, and a sixth diode 132. Each of the six diodes is electrically interconnected with one another within a rectification circuit between one of the plurality of bus bars, i.e. first AC bus bar 134, second AC bus bar 136, third AC bus bar 138, positive DC bus bar 140, and negative bus bar 142, for rectifying AC electrical power received at the AC terminals, i.e. first AC terminal 110, second AC terminal 112, and third AC terminal 114, into DC electrical power. The rectification circuit thereafter provides the DC electrical power to positive DC terminal 116 and negative DC terminal 118 for on-rotor use.

The eight diode plates of rectifier circuit 120 include a first diode plate 144, a second diode plate 146, a third diode plate 148, a fourth diode plate 150, a fifth diode plate 152, a sixth diode plate 154, a seventh diode plate 155, and an eighth diode plate 156. First diode plate 144 electrically connects an anode face of first diode 122 with positive DC us bar 140. Second diode plate 146 is disposed between first diode 122 and second diode 124, and electrically interconnects both a cathode face of first diode 122 and an anode face of second diode 124 with first AC bus bar 134. Third diode plate 148 is disposed between second diode 124 and third diode 126, and electrically interconnects both a cathode face of second diode 124 and a cathode face of third diode 126 with negative DC bus bar 142. Fourth diode plate 150 is disposed between third diode 126 and fourth diode 128, and electrically interconnects both an anode face of third diode 126 and a cathode face of fourth diode 128 with second AC bus bar 136. Fifth diode plate 152 is disposed between fourth diode 128 and fifth diode 130, and electrically interconnects both an anode face of fourth diode 128 and an anode face of fifth diode 130 with positive DC bus bar 140. Sixth diode plate 154 is disposed between fifth diode 130 and sixth diode 132, and electrically interconnects both a cathode face of fifth diode 130 and an anode face of sixth diode 132 with third AC bus bar 138. A resistor 158 electrically connected in series with a seventh diode plate 155 connects a cathode face of sixth diode 132 with negative DC bus bar 142 and eighth diode plate 156 connects resistor 158 with positive DC bus bar 140.

As will be appreciated, rectifier circuit 120 generates heat while rectifying input AC electrical power into DC electrical power. A generator, e.g. generator 200 (shown in FIG. 7), provides a flow of coolant to rectifier 100 for purposes of cooling rectifier circuit 120 while rectifying AC electrical power into DC electrical power. In this respect coolant provided to generator 200 enters rectifier 100 through a coolant aperture defined by transfer tube bushing 108 (shown in FIG. 1), flows across surfaces of the plurality of diodes and other components disposed within housing 102, and exits housing 102 through output end 106. As the coolant traverses rectifier circuit 120, heat transfers from the plurality of diodes to the coolant. This keeps the diodes within a predetermined temperature range during operation, the temperature range being determined by the intended application of rectifier 100.

One challenge to flowing coolant across electrical structures like diodes is that electrostatic charge can accumulate on the structures from the coolant flowing across the structures. Fluids with low electrical conductivity, such as certain types of lubricants and oils, can acquire a space charge as the fluid flows across a solid surface due to the frictional charge separation that occurs at the liquid-solid interface. The space charge developed can be transported by the fluid flow, forming a streaming current in the liquid flow. Lubricant filters, for example, can be sources of streaming charge generation due to the shearing action that occurs within the filter. If the walls bounding the flow system are electrically insulated or have a floating potential, this flow electrification process can cause electrostatic charge to accumulate and potentially generate electrostatic surface potential at liquid-solid interfaces of magnitude sufficient to damage the electrical structure(s) during a discharge event. In the case of lubricant streaming charge with a rotating rectifier, charge accumulation can exceed the rotor circuit dielectric capability, and discharge can occurs. At discharge, the capacitive effects of the rotor circuit insulation can produce a large reverse bias across the diodes, potentially causing the diode to fail.

Rectifier 100 is electrically grounded, thereby limiting electrostatic charge accumulation to below levels where discharge events can potentially damage circuit components. In this respect rectifier 100 includes a transfer tube bushing 108 that electrically connects to positive DC bus bar 140. The electrical connection grounds rectifier circuit 120 through transfer tube bushing 108 and positive DC bus bar 140, thereby providing a path for accumulated electrostatic charge to ground, and enables control of electrostatic discharge events. This prevents electrostatic of discharge of magnitude sufficient to damage components of rectifier circuit 120, such as could otherwise be possible—particularly following an engine lubricant change where static charge accumulation can be significant. Examples of suitable grounding schemes can be found in U.S. Pat. No. 8,063,522, the contents of which are incorporated herein by reference.

Figure 3:
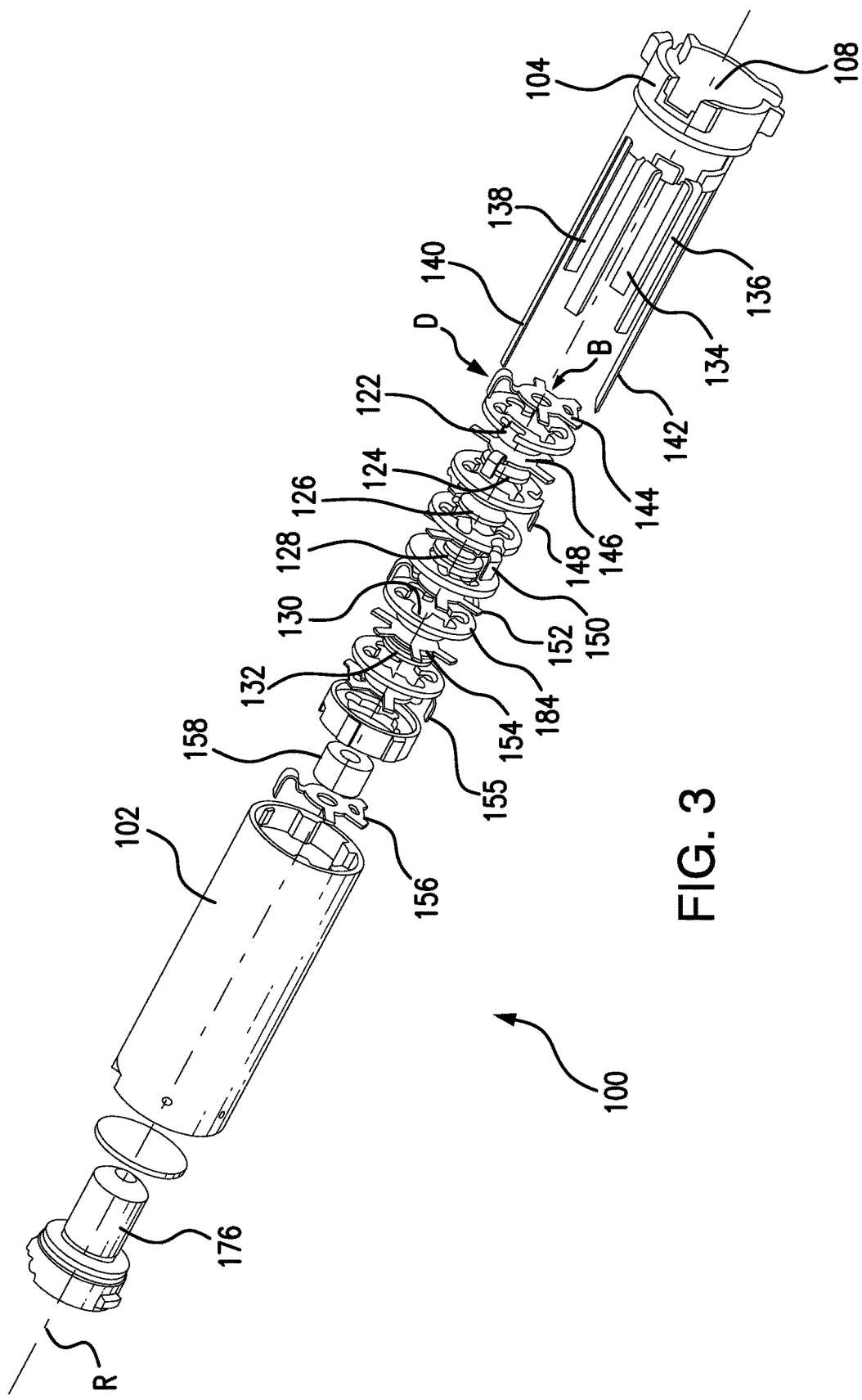
FIG. 3 is an exploded perspective view of the rotating rectifier of FIG. 1, showing axially stacked diodes disposed between nested diode plates.

With reference to FIG. 3, rectifier 100 is shown in an exploded perspective view. Each diode includes an anode face A and a cathode face C. Anode face A and cathode face C are each angled with respect to rotation axis R, and as illustrated are angled at about a 90-degree angle relative to rotation axis R. Examples of suitable diodes are dual-face diodes sold under the trade name PowerEx®, and are available from PowerEx, Inc. of Youngwood, Pa. Each diode plate, i.e. diode plates 144-156, includes a plate-like body B and an axially-extending key D. Please-like body B overlays the face of axially adjacent diode(s), and key D provides electrical connectivity to one of the AC or DC bus bars, i.e. bus bars 134-144.

Figure 4:
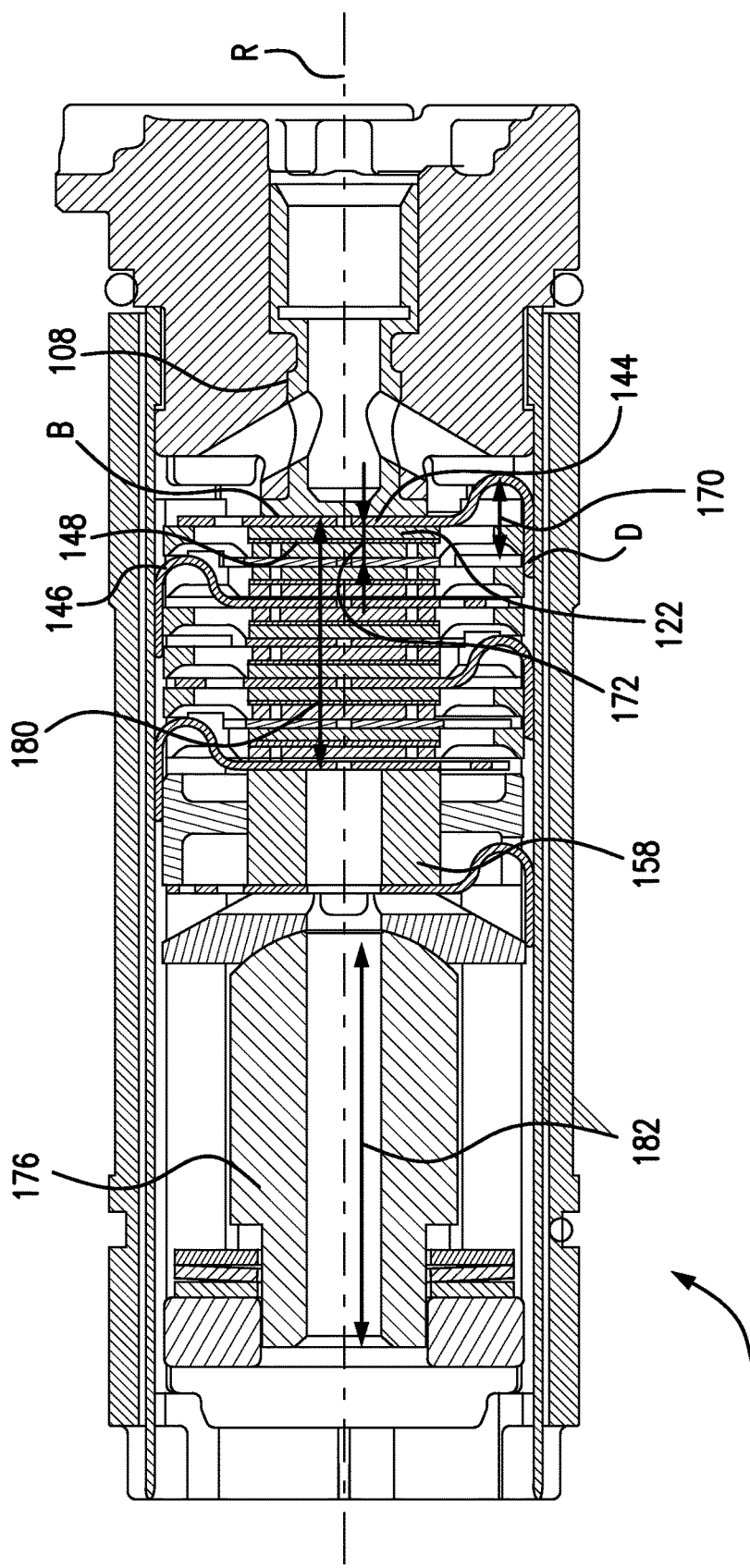
FIG. 4 is a cross-sectional elevation of the rotating rectifier of FIG. 1, showing the axial height of the axially stacked diodes and nested diode plates.

With reference to FIG. 4, rectifier 100 is shown in cross-section. Key D of first diode plate 144 has an axial length 170 that is greater than an axial height 172 of first diode 122. First diode plate 144 also axially overlaps second diode plate 146. Second diode plate 146 is rotationally offset relative to rotation axis such that first diode plate 144 is nested with second diode plate 146, thereby providing an axially compact structure. The axially compact structure provided by the nested arrangement of the diode plates and intervening diode reduces the contact area between the diode and lubricant flowing through rectifier 100, reducing the amount of surface area exposed to the static charge-carrying lubricant. This improves the durability of the diode circuit by reducing the rate at which static charge transfers to the surfaces of the diode devices incorporated in the circuit. As illustrated, first diode plate 144 also axially overlaps and nests with third diode plate 148.

As illustrated in FIG. 3, rectifier 100 includes six diodes (122-132), eight diode plates (144-156), a plurality of diode retainers 184, and a diode pivot 176. The diodes, i.e. diodes 122-132, are each axially stacked in relation to one another. Respective diode retainers 184 circumferentially surround each diode between respective pairs of axially adjacent diode plates. The diode plates, i.e. diode plates 144-156, are axially stacked with one another and nested with one another such that seven of the diode plates overlap and nest with one another. Diode plates 144-156 are also circumferentially clocked with respect to one another about rotation axis R such that each diode plate both is electrically connected with a bus bars and nests with an axially adjacent diode plate.

With continuing reference to FIG. 4, axially stacking the diodes between nested diode plates allows diode pack to have an axial height 180 that is shorter than an axial length 182 of diode pivot 176. Diode pivot 176 is an electrically passive component, and can therefore be lengthened or shortened in relation to housing 102 such that housing 102 can fit into rotor assembly 200 (shown in FIG. 7) without altering the shape of the cavity seating rectifier 100. This can be done, for example, by increasing an axial length of either or both of diode pivot 176 and resistor 158, and without modifying rotor assembly 200.

Figure 5:
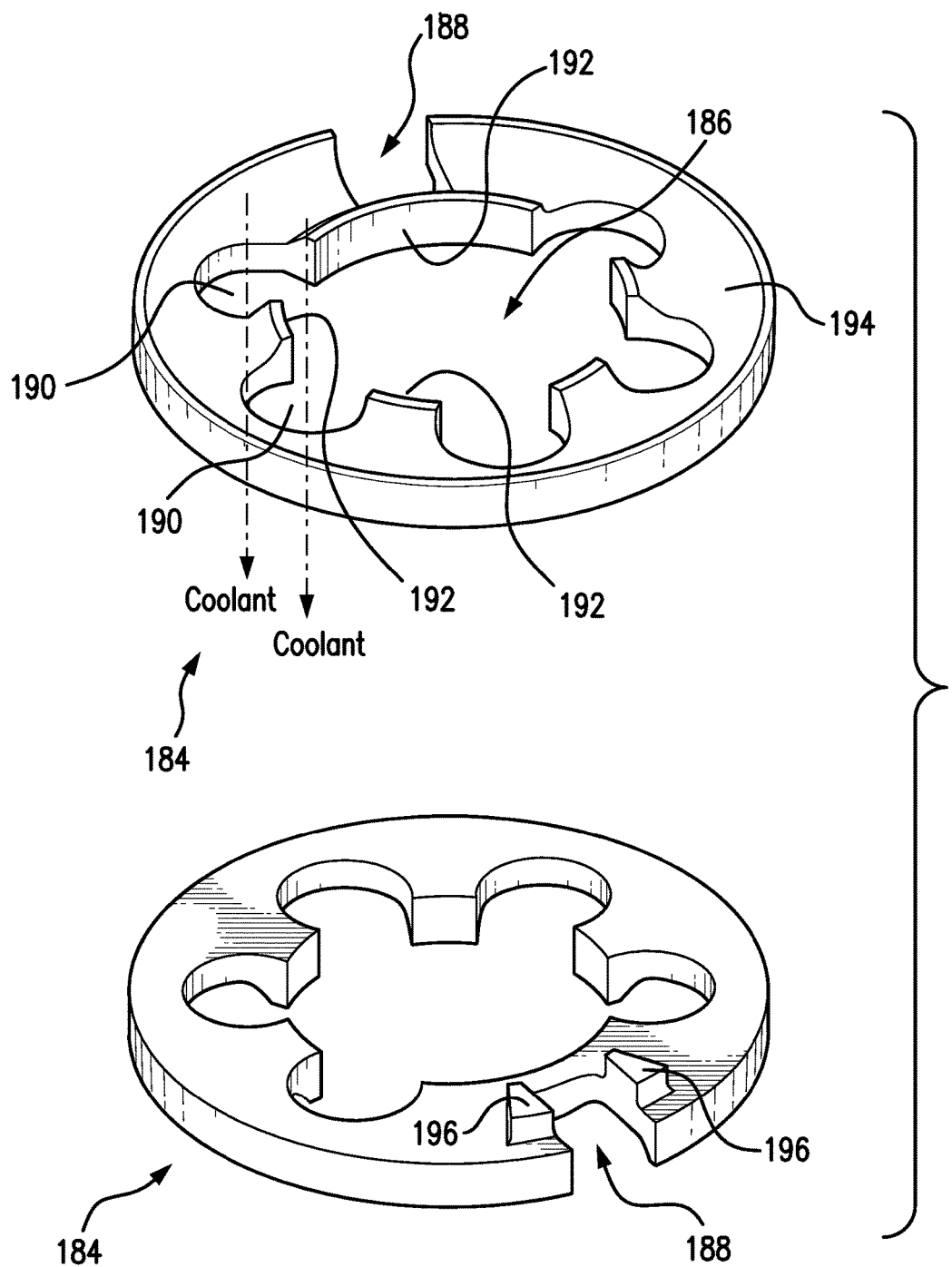
FIG. 5 includes top and bottom perspective views of a diode retainer for the rotating rectifier of FIG. 1, showing coolant passages and diode walls of the diode retainer.

With reference to FIG. 5, diode retainer 184 is shown. Diode retainer 184 includes a retainer body 194. Retainer body 194 defines a central aperture 186 for seating a diode, a keyway 188 for seating and circumferentially locking a diode plate, and a plurality of flow apertures 190. Central aperture 186 is bounded by a plurality of circumferentially adjacent diode surfaces 192 for fixing a diode within diode retainer 184. Flow apertures 190 include suitably sized flow apertures for allowing coolant to flow through rectifier 100 (shown in FIG. 1), along rotation axis R (shown in FIG. 1), and off-axis for purposes of cooling diodes disposed therein. Barrier wall 196 is adjacent to keyway 188 and electrically insulates the diode plates from one another in the radial direction.

Figure 6:
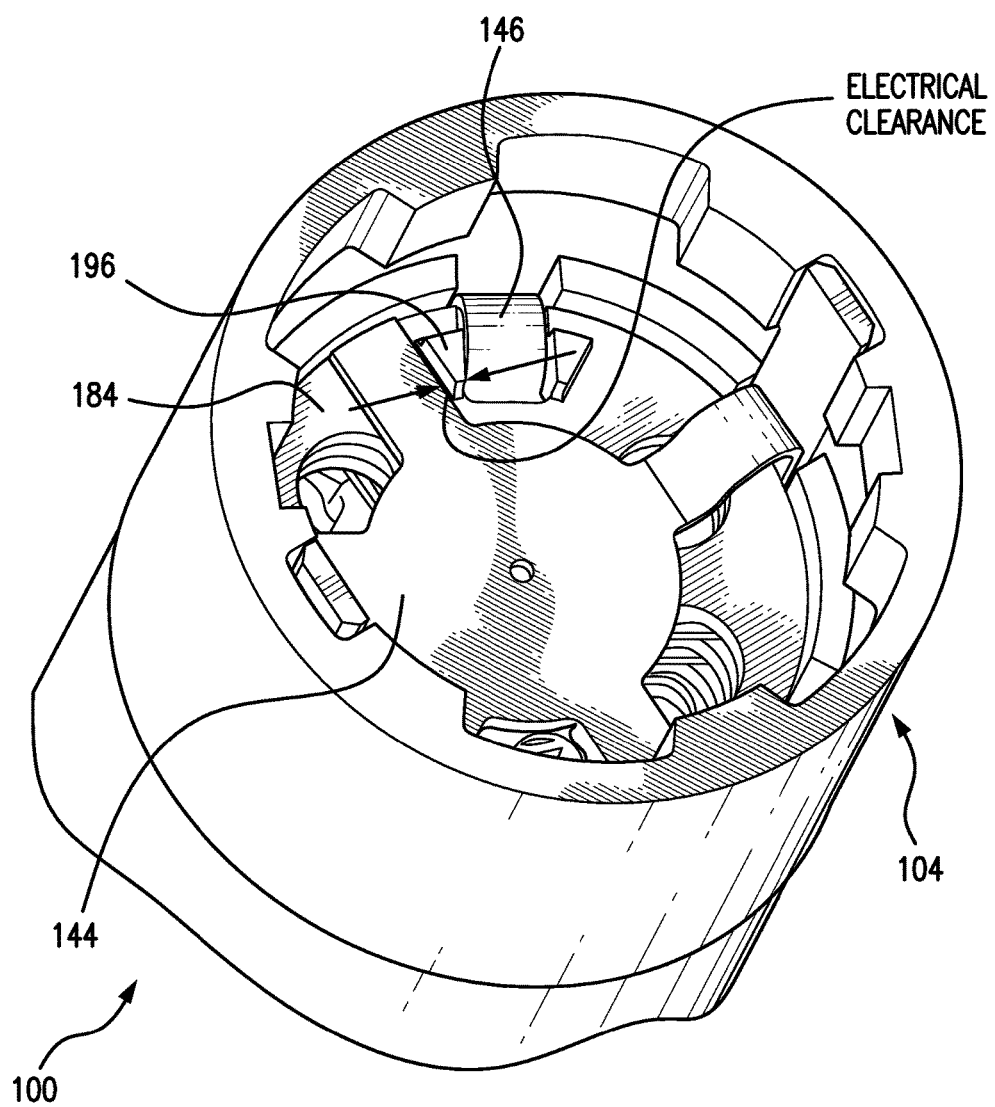
FIG. 6 is a partial perspective end view of the rotating rectifier of FIG. 1, showing an electrical clearance defined between axially adjacent and nested diode plates.

With reference to FIG. 6, first end 104 is shown with oil transfer tube bushing 108 removed. First diode plate 144 is clocked relative to second diode plate 146 by a radially extending wedge profile of barrier wall 196. The width of barrier wall 196 at its radially inner end defines the electrical clearance between first diode plate 144 and second diode plate 146, physically separating first diode plate 144 from second diode plate 146 such that each is electrically isolated from one another within a predetermined potential difference limit. This prevents internal shorting within rectifier 100.

Figure 7:
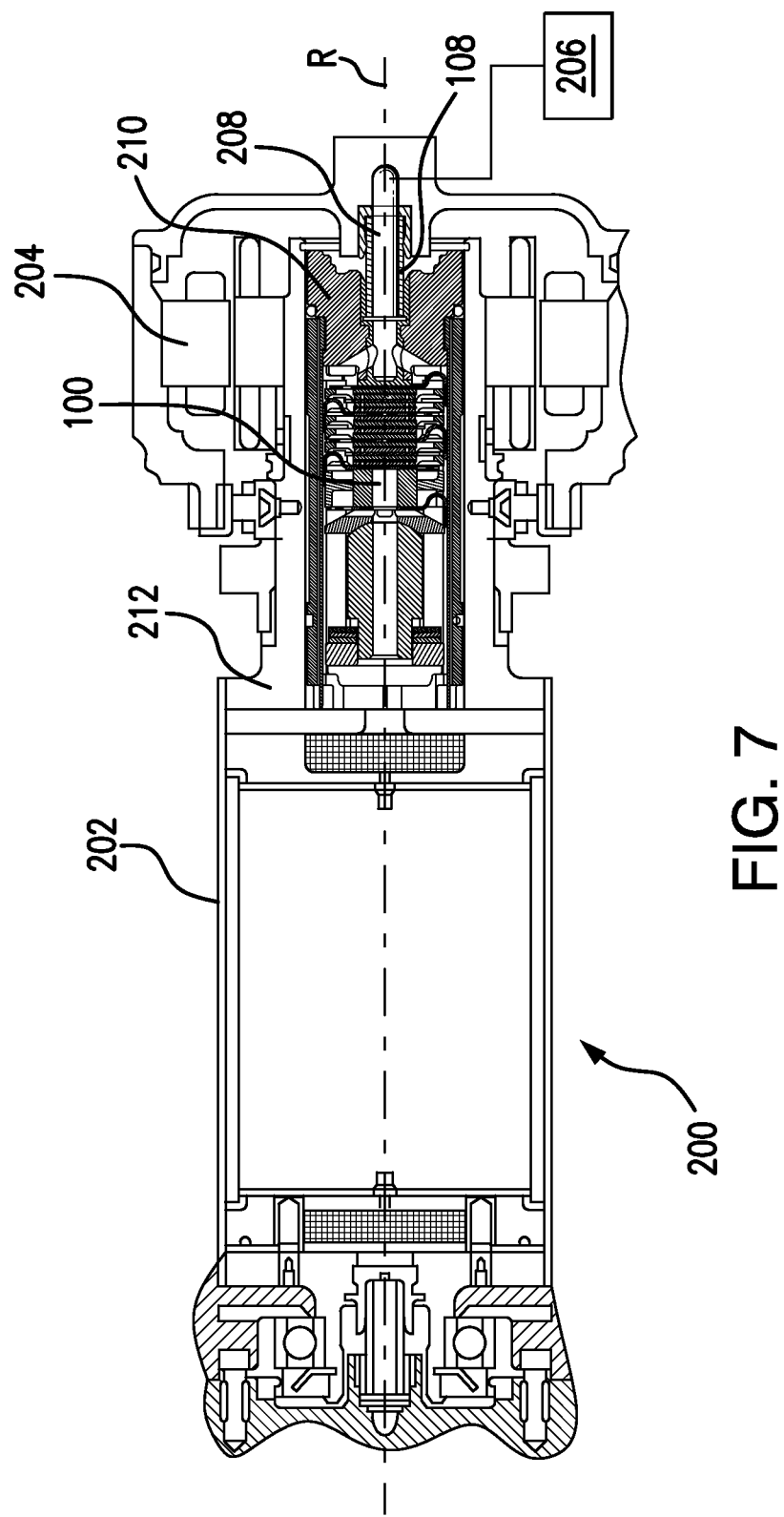
FIG. 7 is a cross-sectional side elevation of a generator including the rectifier of FIG. 1, showing the rotating rectifier seated within a rotor shaft and in fluid communication with a lubrication circuit of the generator.

With reference to FIG. 7, a generator 200 is shown. Generator 200 includes a rotor assembly 202 rotatably disposed in relation to a stator assembly 204. Rotor assembly 202 includes a hollow shaft 212 that seats within its interior rectifier 100 having a diode pack as described above. Stator assembly 204 includes a lubrication circuit 206 that is in fluid communication rectifier 100 and the rectifier diode pack through an oil transfer tube 208. Transfer tube 208 seats within transfer tube bushing 108, is rotatable relative transfer tube bushing 108, and is configured to a flow of lubricant from lubrication circuit 206 through oil transfer tube 208 for purposes of cooling the diode pack disposed within rectifier 100.

While the apparatus and methods of the subject disclosure have been shown and described with reference to preferred embodiments, those skilled in the art will readily appreciate that changes and/or modifications may be made thereto without departing from the spirit and scope of the subject disclosure.

What is claimed is:

1. A rectifier, comprising:
    a diode with opposed anode and cathode faces angled relative to a rotation axis;
    a first diode plate overlaying the anode face of the diode;
    a second diode plate overlaying the cathode face of the diode, wherein the first diode plate and second diode plates are nested within one another such that portions of the first and second diode plates axially overlap along the rotation axis; and
    a diode retainer disposed between the first and second diode plates, wherein the diode retainer circumferentially surrounds the diode,
    wherein diode retainer defines a central diode aperture, the diode aperture being bounded by a plurality of diode surfaces.

2. The rectifier as recited in claim 1, further including an oil transfer tube bushing extending the rotation axis, wherein an end of the oil transfer tube bushing is electrically connected to the first diode plate for grounding the diode through the oil transfer tube bushing.

3. The rectifier as recited in claim 1, wherein each of the diode plates further comprises an axially stacked body with an axially extending key segment, the key segment having an axial length that is greater than an axial height of the diode.

4. The rectifier as recited in claim 3, wherein diode key segments are rotationally offset from one another about the rotation axis.

5. The rectifier as recited in claim 1, wherein a periphery of the diode retainer defines a keyway, wherein a key segment of the first diode plate seats in the diode retainer keyway.

6. The rectifier as recited in claim 5, wherein the diode retainer keyway defines barrier walls, wherein the first diode plate is electrically insulated from the second diode plate.

7. The rectifier as recited in claim 1, wherein the diode retainer defines a plurality of flow passages, the flow passages bounding the central diode aperture and being circumferentially separated by a diode surface.

8. The rectifier as recited in claim 1, wherein the diode is a first diode, and further including a plurality of diodes axially stacked in relation to the first diode.

9. The rectifier as recited in claim 8, wherein the plurality of diodes includes six diodes electrically connected in a rectifier circuit.

10. The rectifier as recited in claim 8, further including a plurality of diode plates, wherein each of the diode plates is axially stacked between adjacent diodes and nested with an adjacent diode plate.

11. The rectifier as recited in claim 10, wherein the plurality of diode plates includes five diode plates.

12. The rectifier as recited in claim 10, wherein the diodes and diode plates form a diode pack with an axial length, and further including a diode pivot extending along the rotation axis and having an axial length greater than the diode pack.

13. A generator, comprising:
   a rotor shaft defining a rotation axis;
   a rectifier circuit fixed in relation to the rotor shaft, including:
      a diode with anode and cathode faces angled relative to the rotation axis;
      a first diode plate overlaying the anode face of the diode;
      a second diode plate overlaying the cathode face of the diode, wherein the first and second diode plates are nested with one another such that portions of the first and second diode plates axially overlap along the rotation axis;
   a diode retainer disposed between the first and second diode plates, wherein the diode retainer circumferentially surrounds the diode, wherein diode retainer defines a central diode aperture, the diode aperture being bounded by a plurality of diode surface; and
   an oil transfer tube extending along the rotation axis and electrically connected to the first diode plate; and
   an oil transfer tube bushing coupled between the first diode plate and oil transfer tube, wherein the oil transfer tube bushing is fixed in relation to the first diode plate and rotatable in relation to the oil transfer tube for grounding the diode through the rotor shaft.

14. The generator as recited in claim 13, wherein each of the diode plates further comprises an axially stacked body with an axially extending key segment, the key segment having an axial length that is greater than an axial height of the diode.

15. The generator as recited in claim 13, wherein the diode retainer defines a plurality of flow passages, the flow passages bounding the central diode aperture and being circumferentially separated by a diode surface.

16. The generator as recited in claim 15, wherein diode key segments are rotationally offset from one another about the rotation axis.

17. The rectifier as recited in claim 13, further including a diode retainer disposed between the first and second diode plates, wherein the diode retainer circumferentially surrounds the diode.

18. The generator as recited in claim 17, wherein a periphery of the diode retainer defines a keyway, wherein a key segment of the first diode plate seats in the diode retainer keyway.

19. The generator as recited in claim 18, wherein the diode retainer keyway defines barrier walls, wherein the first diode plate is electrically insulated from the second diode plate.

* * * * *